US010148520B2

(12) United States Patent
Lee et al.

(10) Patent No.: US 10,148,520 B2
(45) Date of Patent: Dec. 4, 2018

(54) DEVICE PROVISIONING

(71) Applicant: Comcast Cable Communications, LLC, Philadelphia, PA (US)

(72) Inventors: Yiu Leung Lee, Philadelphia, PA (US); Chris Wendt, Exton, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 15/412,106

(22) Filed: Jan. 23, 2017

(65) Prior Publication Data

US 2017/0302527 A1  Oct. 19, 2017

Related U.S. Application Data

(63) Continuation of application No. 14/281,050, filed on May 19, 2014, now Pat. No. 9,590,857.

(51) Int. Cl.
*H04L 12/24* (2006.01)
*H04L 12/751* (2013.01)
*H04W 84/12* (2009.01)
*H04L 12/46* (2006.01)

(52) U.S. Cl.
CPC .......... *H04L 41/12* (2013.01); *H04L 12/4625* (2013.01); *H04L 45/02* (2013.01); *H04W 84/12* (2013.01)

(58) Field of Classification Search
CPC .................................................. H04L 41/12
See application file for complete search history.

(56) References Cited

U.S. PATENT DOCUMENTS

| 9,420,336 | B1* | 8/2016 | Woodhead ......... H04N 21/4408 |
| 9,590,857 | B2* | 3/2017 | Lee ........................ H04L 45/02 |
| 2004/0010569 | A1 | 1/2004 | Thomas et al. |
| 2004/0117462 | A1 | 6/2004 | Bodin et al. |
| 2004/0133689 | A1 | 7/2004 | Vasisht |
| 2007/0211629 | A1* | 9/2007 | Mori ................. H04L 29/06027 370/230 |
| 2009/0024727 | A1 | 1/2009 | Jeon et al. |
| 2009/0132682 | A1 | 5/2009 | Counterman |
| 2009/0213751 | A1* | 8/2009 | Langefeld ............. H04W 48/18 370/254 |
| 2010/0265845 | A1 | 10/2010 | Lampen |
| 2010/0309815 | A1* | 12/2010 | Yepez ................. H04L 12/4625 370/254 |
| 2011/0314137 | A1 | 12/2011 | Vermoesen |
| 2013/0170483 | A1 | 7/2013 | Shichino |
| 2015/0128230 | A1 | 5/2015 | Chang et al. |

(Continued)

*Primary Examiner* — Jason E Mattis
(74) *Attorney, Agent, or Firm* — Banner & Witcoff, Ltd.

(57) ABSTRACT

The disclosure relates to provisioning end devices, such as wireless end devices. In one aspect, a wireless end device may be provisioned with a backend system without requiring a user to enter information to connect the wireless end device to a local wireless network. Moreover, the wireless end device may be provisioned with a single user action. In one example, the single action may be a single click on an activation portal. The single action may trigger the backend system to detect the wireless end device with the help of one or more gateways at one or more premises, and to associate the wireless end device with a user account. The backend system may also facilitate configuring the wireless end device to connect to the proper or desired network at a premises.

18 Claims, 7 Drawing Sheets

(56) References Cited

U.S. PATENT DOCUMENTS

2015/0381416 A1 12/2015 Ramfelt et al.
2016/0254973 A1* 9/2016 Joanny .................... H04L 43/08
370/241

* cited by examiner

DEVICE PROVISIONING

CROSS-REFERENCE TO RELATED APPLICATIONS

This application is a continuation of and claims priority to co-pending U.S. application Ser. No. 14/281,050, filed May 19, 2014, which is hereby incorporated by reference herein in its entirety.

BACKGROUND

New products and devices are being developed for integration into home networks. Example devices include consumer devices, video and audio equipment, home automation equipment, and home security devices, such as sensors and cameras. In order to save cost and size, many of these devices do not have a user interface for users to enter provisioning information so that the devices may be connected to the home network. Moreover, even if the devices may be connected to the home network, the devices may remain unknown to other aspects of a network, such as a backend system, headend, local office, other servers, cloud based systems, security systems, and/or gateways. As such, network technicians or other third party personnel may be required to travel to users' homes to connect devices to home networks and provision devices with a backend system. The use of these technicians and personnel may be costly, inefficient, and an annoyance to some users, and result in more overall cost than the cost of a provisioning interface on the device. Accordingly, there is demand for a more simplified process of connecting, provisioning, controlling, and registering devices on a network.

SUMMARY

Some or all of the various features described herein may facilitate connecting wireless devices to networks (e.g., local area networks, wide area networks, home or premises networks, business networks, cloud based networks, etc.) and provisioning the wireless devices with a remote system (e.g., a service provider, backend system, cloud, or other remote system) without requiring the user to enter specific network or device information. In certain embodiments, this disclosure enables a single action (e.g., one-click) process for provisioning wireless devices, and for registering these devices with a server or other remote site to ensure the devices are updated appropriately and that local and/or remote features are enabled for utilizing the new devices. In this manner, end users can easily purchase and upgrade their systems (e.g., security, garage door, cars, phones, content players, set top boxes, sensors, and other systems for one or more houses) while having the new devices seamlessly integrated into the users' ecosystems and having them registered and updated and accessible locally and remotely. Features of the disclosure may be implemented on backend systems (e.g., a cell phone provider system, a data network provider system, a cloud based system, and/or other remote system), gateways (e.g., set top boxes, alarm panels, computers, hubs, or other devices providing access points to a backend system), and end devices (e.g., sensors, cameras, infrared detectors, clocks, electronic picture frames, garage door openers, climate control, lighting systems, etc.).

In accordance with some aspects of the disclosure, a method, system, and apparatus are disclosed in which a computing device (e.g., an application server) may identify a target premises to be associated with an end device (e.g., a wireless end device, such as a security sensor, camera, etc.). In some embodiments, it may be desirable to determine a set of one or more candidate gateways in proximity (e.g., 10 meters, 20 meters, 50 meters, 100 meters, 200 meters, and/or 500 meters) to any reference point or location, such as the target premises, and monitor some, or all, information received from the candidate gateways. For example, when a new end device is purchased and brought into a location such as a premises, the device may find numerous gateways to which it may connect. For example, each premises may have a number of gateways, adjacent premises may have a number of gateways, and/or there may be various other network options such as different network protocols and/or wireless protocols associated with a local and/or remote gateway. The device may have a wide selection of candidate gateway options and/or protocols on which to potentially connect. The end user device may evaluate each of the candidate gateways based on, for example, signal strength, type of gateway, protocol, types of systems actively associated with the gateway, and/or service provider and/or backend systems associated with the gateway.

Alternatively, and/or additionally, the device may monitor multiple gateways and await an appropriate signal from one of the gateways to initiate a provisioning procedure. Embodiments may further include evaluating information transferred to and/or from one or more gateways to determine whether the end device has been detected. In some embodiments, the backend system may detect the end device even if it connects to an undesired gateway (e.g., a neighboring gateway as opposed to a gateway at the target premises, a non-preferred gateway at the target premises, etc.).

The method may also include a step of associating the end device with the target premises. The associating may include determining a user account in association with the target premises and identifying information (e.g., network information) available (e.g., stored) in association with the user account. The step of associating may also include updating a profile associated with the target premises to include information describing the end device (e.g., indicating a type or model number of the end device).

Further, the method may include transmitting network information (e.g., a network SSID, such as a home network SSID, a network password, such as a home network password, etc.) of the target premises to the end device. In some embodiments, a communication may include instructing a target gateway at the target premises to transmit the network information to the end device. The end device then may reconnect to the gateway at the target premises using the transmitted network information instead of a preconfigured activation SSID, for example, which may be common to multiple gateways at different premises. For example, a user might use an application on his/her smartphone, tablet, or another device to scan a bar code on the device and have the device be automatically granted access rights to the network, provisioned, and registered with any remote systems. Alternatively, the user might simply type in a serial number or select a device from a pull down menu on a local and/or cloud based application. In some embodiments, the device might simply be placed in proximity to a gateway (e.g., a security panel), and a proximity sensor and/or RFID may be used to automatically detect, provision, and register the device.

In certain embodiments, a computing device (e.g., a remote and/or local server) may receive a request to activate an end device at a target premises (e.g., a particular home or business); identify a particular gateway from among a plurality of gateways based on the request; and transmit an instruction to the particular gateway at the target premises to transmit a particular activation SSID, which may be a dedicated SSID that is hidden from users (e.g., users residing or working at the target premises and/or users visiting the target premises). The computing device may also monitor information from various gateways to determine whether the end device is connected to one of the gateways; and transmit, or instruct one of the gateways to transmit, network information (e.g., a home SSID or business SSID) to the end device. As a result, the end device may connect to a local wireless network at the target premises. Further, the computing device may associate the end device with a user account (e.g., which may correspond to a user account established at a local and/or remote location to receive various services, such as television, home security, home monitoring, HVAC control, sensor monitoring, camera monitoring, etc.).

In another aspect, a method includes receiving a request to connect an end device to a network at a target premises; detecting that the end device is connected to a different network (e.g., a neighboring local wireless network) than the network at the target premises; and transmitting an instruction to change an SSID (e.g., from an activation SSID which may be hidden to users to another SSID) of the end device to connect the end device to the network at the target premises. To detect whether the end device is connected to different network, a backend system may evaluate information received from a set of candidate gateways, which may correspond to all gateways within a certain proximity to an area, such as the target premises. Additionally, aspects of the present disclosure teach computing devices, having processor(s) and memory storing computer-executable instructions, and other apparatuses to perform the above steps and other steps for provisioning an end device with a backend system.

This summary is not intended to identify critical or essential features or provide an exhaustive listing of novel features disclosed herein, but instead merely summarizes certain features and variations thereof. These and other details and features will be further described in the sections that follow.

BRIEF DESCRIPTION OF THE DRAWINGS

Some features herein are illustrated by way of example, and not by way of limitation, in the figures of the accompanying drawings in which like reference numerals refer to similar elements.

DETAILED DESCRIPTION

Figure 1:
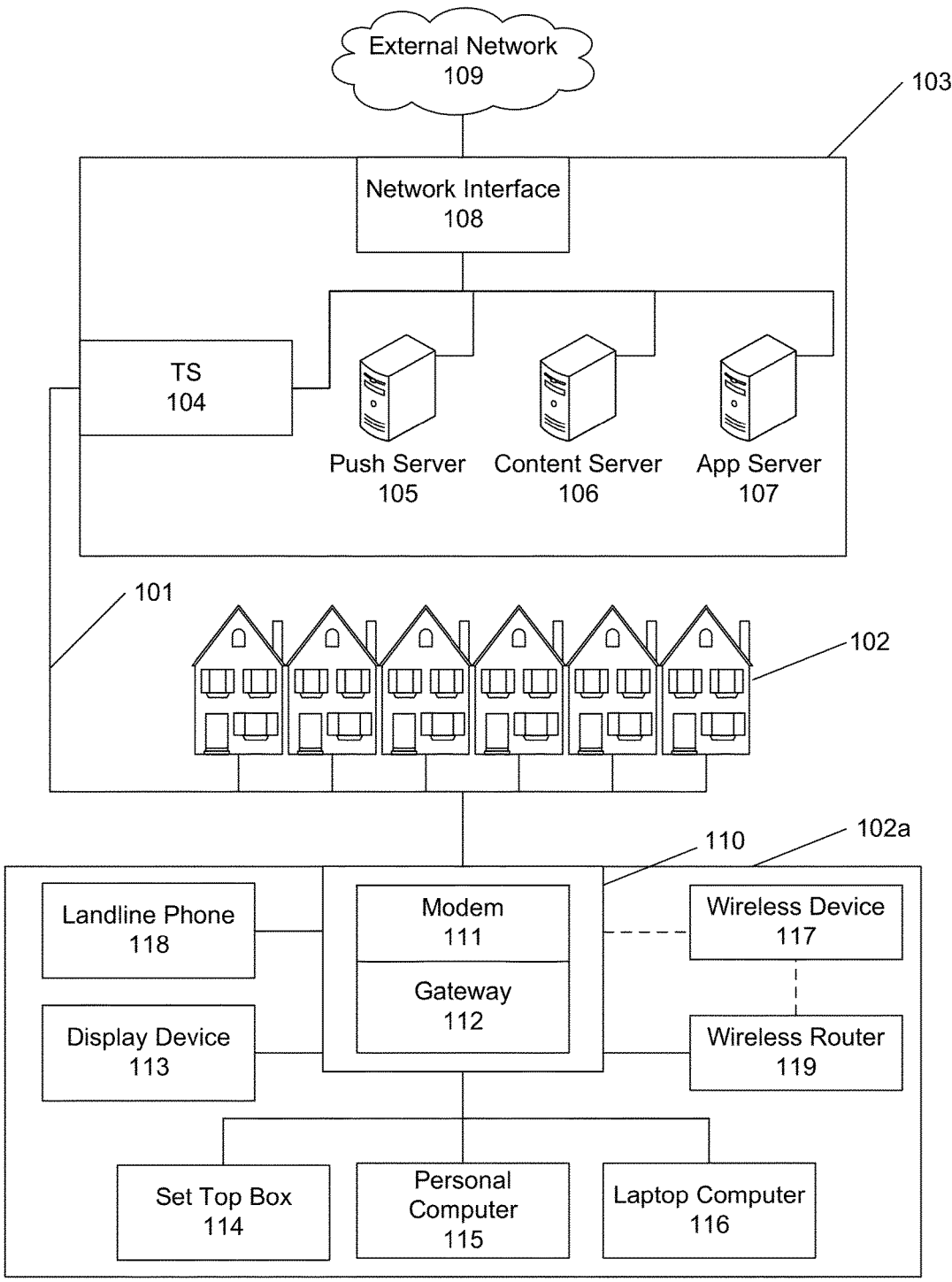
FIG. 1 illustrates an example communication network on which various features described herein may be used.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

By way of introduction, the various features described herein may allow a user to connect a wireless device to their home (or business or other premises) network and provision that device with a backend system (e.g., a service provider system) without entering device or local network information. Aspects of this disclosure include a single action (e.g., one-click, one swipe, and/or one association) process by which a user may connect, provision, and/or register wireless devices. As a result, users may purchase or otherwise obtain wireless devices from any store or source on-line and seamlessly integrate them into their network (e.g., a local security system). Moreover, as the wireless devices are connected to the local network, they may be provisioned with a backend system without further outside assistance (e.g., assistance from a technician of the service provider), and registered on that remote system. Provisioning wireless devices with a remote system (e.g., a backend system) may enable users to take advantage of additional services, allow the devices to be controlled and/or monitored remotely, and/or allow the devices to receive updates. For example, backend systems may provide software updates for wireless devices on a local network, remote storage of information obtained by wireless devices on the local network, and remote processing of information obtained by wireless devices. In some cases, unless a wireless device is provisioned with a backend system, users might not be taking advantage of the full capabilities of the wireless device and service offerings.

Aspects of the disclosure account for the possibility that a wireless device could latch on to the wrong local network. For example, a system as described herein may ensure that a wireless device is connected to the proper home network and not a neighbor's home network or other nearby network. In urban areas (e.g., cities) or where multiple local networks are in close proximity (e.g., apartment buildings, office buildings, etc.), there may be more concern that wireless devices are connected to the wrong network. The system of the instant disclosure may overcome this obstacle by having the backend system provision the wireless device and determine which local network information (e.g., a service set identifier (SSID)) should be sent to the wireless device. In this regard, the backend system may instruct a local network gateway (e.g., home gateway) to provide the local network information to the new wireless device or may directly communicate with the wireless device to provide the proper local network information.

FIG. 1 illustrates an example communication network 100 on which many of the various features described herein, such as providing an activation portal and exchanging communications to automatically provision wireless devices to connect them to a network (e.g., a local network) at a premises (e.g., a home, business, etc.), may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, although each split may introduce some degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be a device as specified in a standard, such as the Data Over Cable Service Interface Specification (DOCSIS) standard, published by Cable Television Laboratories, Inc. (a.k.a. Cable-Labs), or it may be a similar or modified device instead. The interface 104 may be configured to place data on one or more downstream frequencies to be received by modems at the various premises 102, and to receive upstream communications from those modems on one or more upstream frequencies. For example, the interface 104 may transmit and receive one or more Moving Picture Expert Group (MPEG) datastreams, such as MPEG-2 and MPEG-4 streams.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server 107 may be responsible for collecting television program listings information and generating a data download for electronic program guide listings. Another application server 107 may be responsible for monitoring user viewing habits and collecting that information for use in selecting advertisements. Yet another application server 107 may be responsible for formatting and inserting advertisements in a video stream being transmitted to the premises 102. In some embodiments, the application server 107 may be configured to provide a backend provisioning system. For example, the application server 107 may include one or more processors and memory storing computer-executable instructions that, when executed by the one or more processors, causes the application server 107 to provision an end device (e.g., a wireless device) for inclusion within a network (e.g., a local network, such as a home network) and register the end device with a user account or premises account. The application server 107 may include its own backend provisioning database to store user account information and corresponding network information and/or billing information. For example, a backend provisioning database may store a user account in association with local network information (e.g., a home SSID, password, gateway identifier or serial number, gateway MAC address, etc.), information identifying services available to a user, and/or information identifying each of the devices and features thereof. The application server 107 may also include a billing server to track billing for certain services of the backend provisioning system.

Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data, such as information for identifying a user account.

An example premises 102a, such as a home or business, may include an interface 110. The interface 110 may include computer-executable instructions (e.g., an application or program) for performing one or more aspects of the disclosure, such as providing an activation portal (e.g., web portal) for users to initiate activation of a device. The interface 110 can include any communication circuitry needed to allow a device to communicate on one or more links 101 with other devices in the network. For example, the interface 110 may include a modem 111, which may include transmitters and receivers used to communicate on the links 101 and with the local office 103. The modem 111 may be, for example, a coaxial cable modem (for coaxial cable lines 101), a fiber interface node (for fiber optic lines 101), a twisted-pair telephone modem, a cellular telephone transceiver, a satellite transceiver, a local wi-fi router or access point, or any other desired modem device. Also, although only one modem 111 is shown in FIG. 1, a plurality of modems 111 operating in parallel may be implemented within the interface 110.

Further, the interface 110 may include a gateway 112. The modem 111 may be connected to, or be a part of, the gateway 112. The gateway 112 may be a computing device that communicates with the modem(s) 111 to allow one or more other devices in the premises 102a, to communicate with the local office 103 and other devices beyond the local office 103. The gateway 112 may be a set-top box (STB), digital video recorder (DVR), computer server, media hub, home automation controller, alarm panel, or any other desired computing device. The gateway 112 may also include (not shown) local network interfaces to provide communication signals to requesting entities/devices in the premises 102a, such as display devices 113 (e.g., televisions), additional STBs 114, personal computers 115, laptop computers 116, wireless devices 117 (e.g., sensors, wireless laptops, notebooks, tablets and netbooks, cordless phones (e.g., Digital Enhanced Cordless Telephone (DECT) phones), mobile phones, mobile televisions, personal digital assistants (PDA), and other end devices), landline phones 118 (e.g. Voice over Internet Protocol (VoIP) phones), a wireless router 119 or other hub, and any other desired devices (e.g., an alarm panel). Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15, IEEE802.16, IEEE 802.1x), analog twisted pair interfaces, Bluetooth interfaces, ZigBee interfaces, and others.

Figure 2:
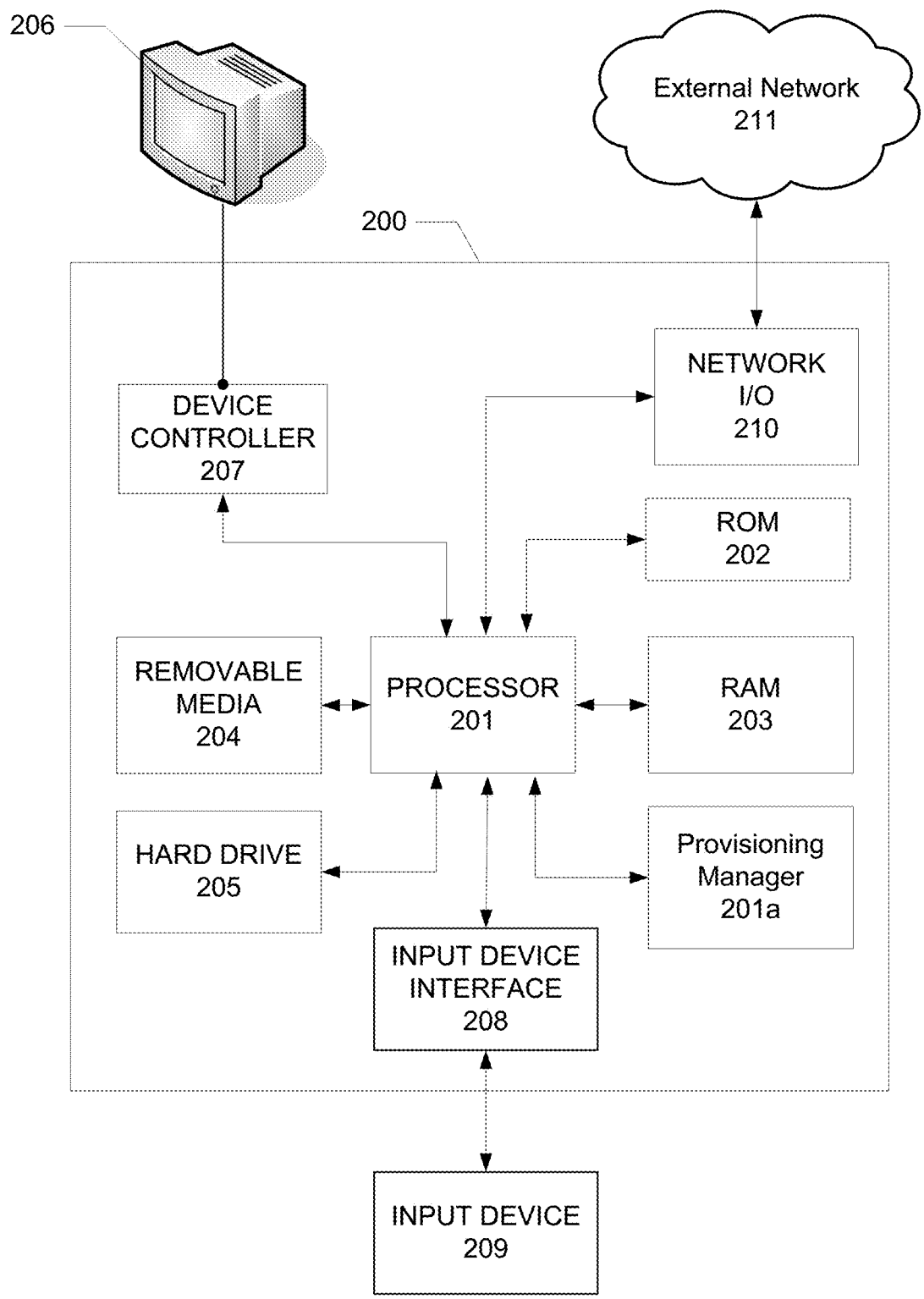
FIG. 2 illustrates an example computing device and software configuration that can be used to implement any of the methods, servers, entities, and computing devices described herein.

FIG. 2 illustrates general hardware elements that can be used to implement any of the various computing devices (e.g., gateways, backend system devices, end devices, etc.) discussed herein. For example, elements of computing device 200 may be used to implement the interface 110 of FIG. 1. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205.

The computing device 200 may include one or more output devices, such as a display 206 (e.g., an external television, LED screen, LCD screen, etc.) or speakers, and may include one or more output device controllers 207, such as a video processor. Further, the computing device may include an input device interface 208 (e.g., infrared (IR) interface, Near Field Communication (NFC) interface, radio frequency identification (RFID) reader, etc.) for communicating with one or more user input devices 209, such as a remote control, keyboard, mouse, touch screen, microphone, camera, etc. The computing device 200 may also include one or more network interfaces, such as a network input/output (I/O) circuit 210 (e.g., a network card) to communicate with an external network 211. The network input/output circuit 210 may be a wired interface, wireless interface, or a combination of the two. In some embodiments, the network input/output circuit 210 may include a modem (e.g., a cable modem), and the external network 211 may include the communication links 101 discussed above, the external network 109, an in-home network, a provider's wireless, coaxial, fiber, or hybrid fiber/coaxial distribution system (e.g., a DOCSIS network), or any other desired network.

The FIG. 2 example is a hardware configuration. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device). Additionally, the computing device 200 may include a provisioning manager 201a, which can perform the various methods for provisioning a wireless device described herein, as a replacement for, or augment to, any other processor 201 that the computing device 200 may include. That is, the provisioning manager 201a may include a separate processor and/or set of computer-executable instructions stored on a computer-readable medium that, when executed by a processor, cause the processor (or the computing device 200 as a whole) to perform the various methods of the present disclosure, such as providing an activation portal, transmitting SSIDs, and identifying a wireless device. The provisioning manager 201a may also include secure memory (not shown), which can store the various user account information, encryption information, and SSID information described herein. The secure memory can be any desired type of memory, and can have enhanced security features to help restrict access (e.g., can only be accessed by the provisioning manager 201a, can be internal to the provisioning manager 201a, etc.). Where the provisioning manager 201a includes a separate set of computer-executable instructions, these instructions may be secured such that only authorized users may be allowed to modify, augment, or delete them.

In some embodiments, the provisioning manager 201a may be implemented as an application specific integrated circuit (ASIC). That is, the provisioning manager 201a may be a chip designed specifically for performing the various processes described herein. Further, the ASIC may be implemented within or in communication with various computing devices provided herein.

One or more aspects of the disclosure may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
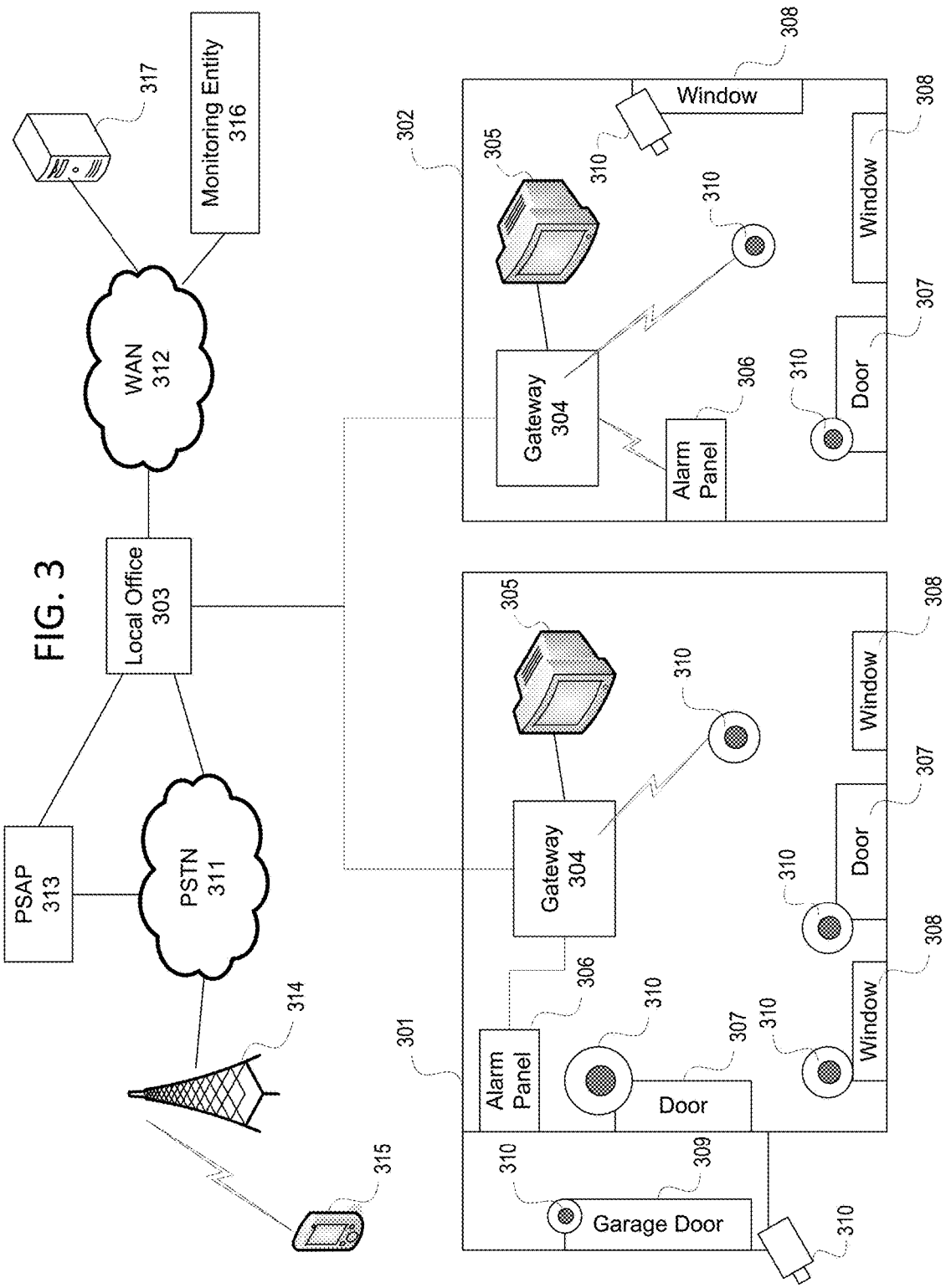
FIG. 3 is a diagram of an environment in which one or more illustrative aspects described herein may be implemented.

FIG. 3 is a diagram showing an example operating environment 300 in which various features described herein may be performed and implemented. As shown in the FIG.

3, the environment 300 may include indoor and/or outdoor areas associated with one or more premises 301, 302 (which may correspond to the premises 102 of FIG. 1), such as a user residence, business, recreational facility, public building, open-air space, etc. Specifically, FIG. 3 illustrates a first premises 301 and a second premises 302. The first premises 301 and the second premises 302 may be neighboring (or closely proximate) premises (e.g., neighboring houses or two apartments in the same building or nearby buildings). Both the first premises 301 and the second premises 302 may be serviced by the same local office 303 (which may correspond to the local office 103 of FIG. 1), such as a regional office of a network service provider. The local office 303 may connect to a gateway 304 (which may correspond to the interface 110 or gateway 112 of FIG. 1) located in/near each of the premises 301, 302. The gateway 304 may be connected to various wired or wireless devices, such as a display device, such as a television, tablet, cell phone, and/or other display device 305. The gateway 304 may also be connected to one or more alarm panels 306 via a wired and/or wireless connection. By way of example, in the embodiment shown in FIG. 3, the gateway 304 in premises 301 may be connected to an alarm panel 306 via a wired connection, while the gateway 304 in premises 302 may be connected to an alarm panel via a wireless connection.

The premises 301, 302 may also have one or more doors 307, one or more windows 308, and one or more garage doors 309. Notably, end devices 310 may be placed at each premises 301, 302. The end devices 310 may communicate directly or indirectly to the gateway 304 at the same premises via wired or wireless connections. The end devices 310 may also communicate with other end devices 310 via wired or wireless connections. Examples of end devices 310 may include sensors (e.g., security sensors, such as proximity sensors, contact switches, motion detectors, etc.), cameras, cell phones, baby monitors, and audio/video devices. However, the end devices 310 are not limited to these examples, and may be any other device that may connect to the gateway 304 to become a part of the local network of the premises. Accordingly, various structural differences among the end devices 310 may exist. Some end devices 310 may include user interfaces (e.g., buttons, screens, microphones and speakers, etc.) through which users may provide information to the end device 310 or ascertain information from the end device 310, while other end devices 310 might not have such sophisticated user interfaces. For example, some end devices 310 might only have an on/off switch for users to control (without taking the end device apart and/or reprogramming the end device).

Further, different end points 310 may serve different functions and trigger different events. For example, an end device 310 may be a motion detector in proximity to a door 307 or window 308 of the first premises 301, and may cause a light to turn on and/or an alarm to sound (or send information to an alarm panel or the gateway 304 to take such actions). FIG. 3 also shows that client devices 310 may be cameras for monitoring the outside of the first premises 301 or the inside of the second premises 302. Some end devices 310 may be mobile and may move about the premises 301, 302. Indeed, some end devices 310 may even leave the premises 301, 302 and return to the same premises 301, 302 or be moved to a new premises.

In light of the example diagram of FIG. 3, various features may be realized. For example, a display device, such as the television 305, may be used to interface with and control settings of any of the one or more end devices 310. A user may, therefore, use his/her television 305 to view data collected by the end devices 310, such as images captured by a camera 310, or view status information of the end devices, such as information indicating which end devices 310 are active and/or working properly. The television 305 may also be used to configure one or more of the end devices 310. This may especially be helpful where the end devices 310 do not have their own user interfaces or where their own user interfaces are difficult to use (e.g., have smaller screens or require more steps).

As mentioned above, the gateways 304 of FIG. 3 may communicate with the local office 303. Moreover, the gateways 304 may communicate with external networks through the local office 303. For example, a gateway 304 may communicate with a Public Switched Telephone Network (PSTN) 311 or a Wide Area Network (WAN) 312, such as the Internet. In some embodiments, the gateway 304 may communicate directly (e.g., without going through the local office 303) with such external networks.

In some cases, the local office 303 may be configured to communicate directly with a public safety answering point (PSAP) 313. In other cases, the gateway 304 may connect to a PSAP 313 through the PSTN 311. Thus, the gateway 304 may be used to communicate emergencies (such as a break in, fire, medical emergency, etc.) to the proper authorities so that help may be dispatched to the appropriate premises 301, 302. Also, through the PSTN 311, the gateway 304 may connect to a cellular backhaul (e.g., including cell towers, base stations, etc.) 314 and ultimately to a cellular device 315. Given the connection of the gateway 304 to the PSTN 314 and cellular backhaul, a user in premises 301 may operate his/her television 305 to send/receive a call or text message to a cellular device 315.

Further, through the WAN 312, the gateway 304 may connect to a monitoring entity 316. The monitoring entity 316 may be affiliated with the entity controlling the local office 303 or a separate third party entity. The monitory entity 316 may include devices and personnel for monitoring information sent from the premises 301, 302 through their gateways 304. The monitoring entity 316 may evaluate information sent by end devices 310 to determine whether there is an emergency, and may dispatch help accordingly. Also, through the WAN 312, the gateway 304 may connect to a web portal server 317. The web portal server 317 may be a computing device capable of providing a web portal that users may access on any device connected to the WAN 312 (e.g., any IP connected device, such as a smartphone, tablet, etc.). Users may access the web portal to view their account information, edit their account information, and/or provision end devices 310 as described further herein.

Although not shown in FIG. 3, the local office 303 may include a backend system configured to provision the end devices. The backend system of the local office 303 may receive information from the gateways and send instructions to the gateways 304. The backend system of the local office 103 may also communicate with the end devices 310 through the gateway 304. Such communications may be directly with the end devices 310 (where the backend system addresses information packets to specific end devices 310) or indirectly (where the backend system addresses information packets to the gateway 304 and designates which end device 310 the information packets pertain to). The backend system of the local office 303 may also control communications through either the PSTN 311 or WAN 312 and may communicate with any other entity (e.g., PSAP 313 or monitoring entity 316). In particular, the backend system of the local office 303 may be configured to exchange information (e.g., user account information) with the web portal server 317. In some embodiments, the web portal server 318 may be implemented in the local office 303 (e.g., as an application server 107 of the local office 303).

Figure 4:
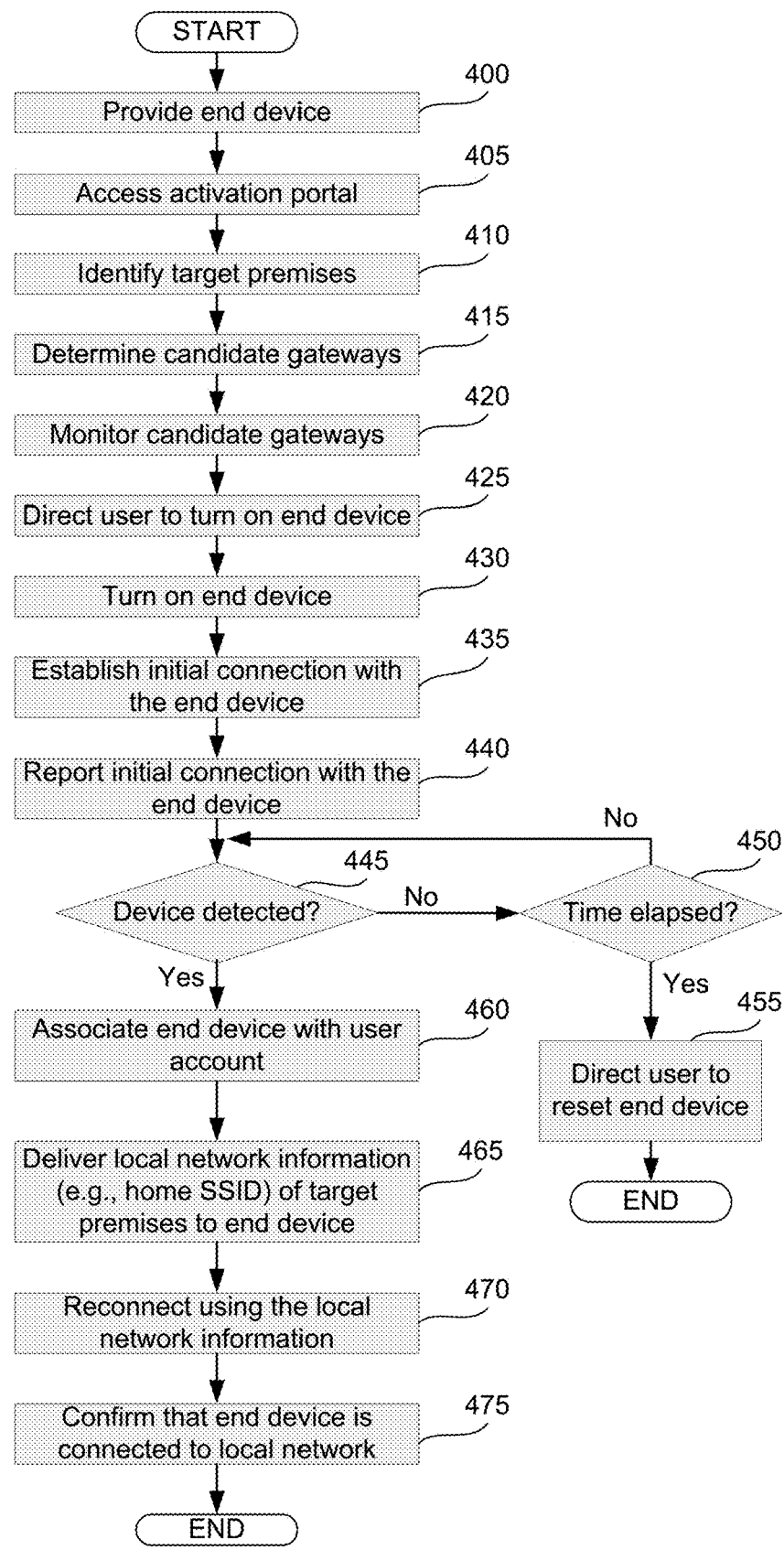
FIG. 4 illustrates a flow diagram illustrating an example method according to various aspects of the disclosure.

FIG. 4 is a flow diagram illustrating an example method of the present application in which a backend system may provision a wireless device connected or connecting to a local network. Using this method, the backend system may automatically discover wireless devices that are added to a local network and activate the wireless device so that related services may be provided. Moreover, this method permits the backend system to provision the wireless device without requiring a user to enter wireless network (e.g., WiFi) related information. In particular, FIG. 4 provides a single action (e.g., one click) methodology for backend provisioning of a wireless device (and wired devices as well).

The method of FIG. 4 begins with a step 400 of providing an end device 310. The end device may be an off-the-shelf device or an operator provided device. For example, users may purchase an end device from a retailer, which may be separate from an entity providing a backend system. Alternatively, the end device 310 may be provided (e.g., shipped) to the user. In any event, the user may bring the end device 310 onto his/her premises (e.g., into his/her home) without the presence of personnel associated with the backend system. In other words, the user may introduce the end device 310 into his/her home and attempt to activate the end device 310 without the presence of an employee (e.g., a technician) of an entity controlling the backend system.

In the description of FIG. 4 below, it is assumed that the end device 310 is a wireless end device (e.g., a web camera or other web sensor) that is configured to wirelessly connect (e.g., via a WiFi connection) to the gateway 304 of a premises 301, 302. It is also assumed that the wireless end device does not have a user interface (or other input console) that allows a user to enter network configuration information (e.g., SSIDs, IP addresses, MAC addresses, etc.). Nevertheless, it should be understood that the processes of FIG. 4 may be implemented using an end device 310 that connects via a wired connection to the gateway 304 and/or that has a user interface for entering network configuration information.

In step 405, a user may access an activation portal when the user is ready to activate the wireless end device 310. The user may be informed of the activation portal by instructions in a manual accompanying (or otherwise available for) the wireless end device 310. Such instructions could also be provided on the wireless end device itself, on a label of the wireless end device, or on packaging of the wireless end device. There may be various ways in which to implement the activation portal, and thus, various ways in which to reach the activation portal. Accordingly, the instructions may indicate multiple ways in which the user may access the activation portal.

In some embodiments, the activation portal may be implemented as a web page. The web page may be stored on a host computing device and accessible using a web browser. In such cases, a user may be instructed to visit the web page and may be provided with a uniform resource locator (URL), a link (e.g., where the instructions are provided electronically they may include a link that opens and directs a web browser to the appropriate web page), or other address that will allow the user to find the web page. A user may navigate to the web page using any IP connected device, such as a smartphone, tablet, PC, laptop, STB, DVR, etc., configured to execute a web browser. Once the user navigates to the activation portal, the user may be prompted to enter authentication information (e.g., a username and/or password). This authentication information may be specific to an individual, a premises (e.g., a particular home), or a group of premises (e.g., a group of properties owned by the same person, company, or organization). After the authentication information is entered, it may be transmitted and submitted to the backend system which may determine whether to authenticate the user. If the entered authentication information matches authentication information associated with a user account stored by the backend system or a device connected thereto, the backend system may authorize the device hosting the activation portal to permit the user to log-into the activation portal.

Figure 5A:
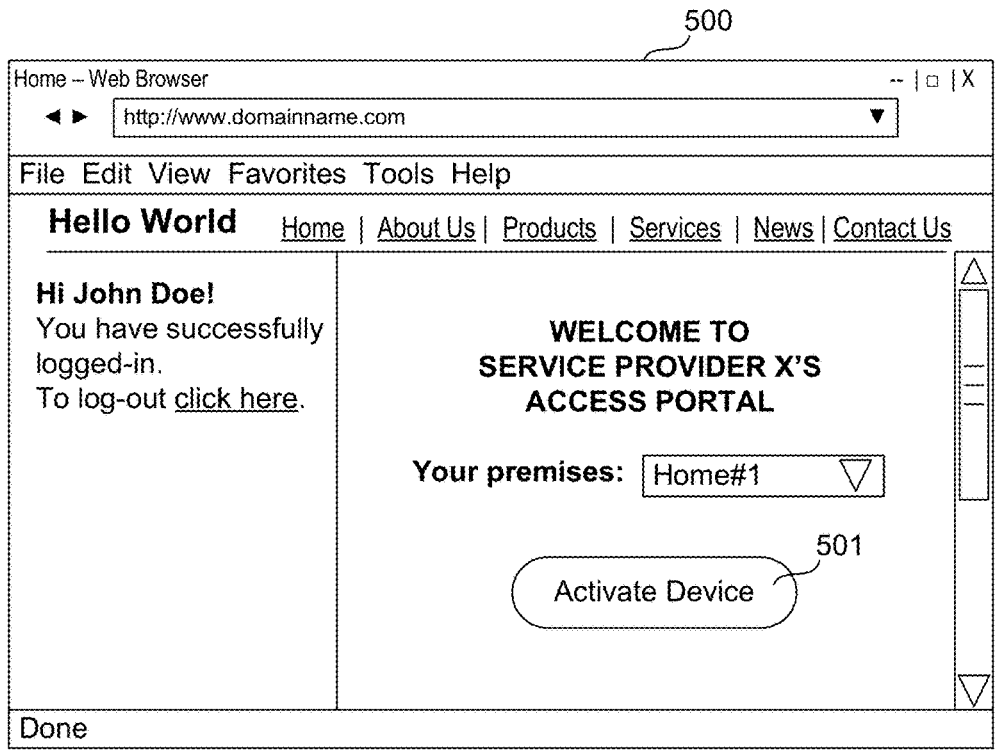
FIGS. 5A-5C are diagrams illustrating some aspects of the disclosure.

Once logged into the activation portal, an activation screen 500 as illustrated in FIG. 5A may be shown by the web browser. The activation screen 500 may be the same web page as the log-in web page or another web page of the same website as the log-in page. If more than one premises is associated with the user account, the user may select which premises the wireless end device 310 is to be affiliated with. For example, if a person owns two homes, that person may choose which home the wireless end device 310 is to be used at. The user account information may specify a default premises so that the user might not have to choose a target premises. With the target premises selected, the user may select an activate device option 501 (e.g., a virtual button on a touchscreen or similar link). In response to selecting the activate device option 501, the device executing the web browser (e.g., a user's smartphone, tablet, PC, etc.), or the device hosting the web page (or any other device), may send a signal to the backend system. This signal may include information indicating that a device is to be activated at a premises, as well as information identifying the premises (or geographic location of a premises, e.g., a physical address, geographical coordinates, IP address, etc.). The information may be included within IP packets (e.g., IPv4 or IPv6 packets) and transmitted over the WAN 312 (e.g., Internet) to the backend system in the local office 303.

Figure 5B:
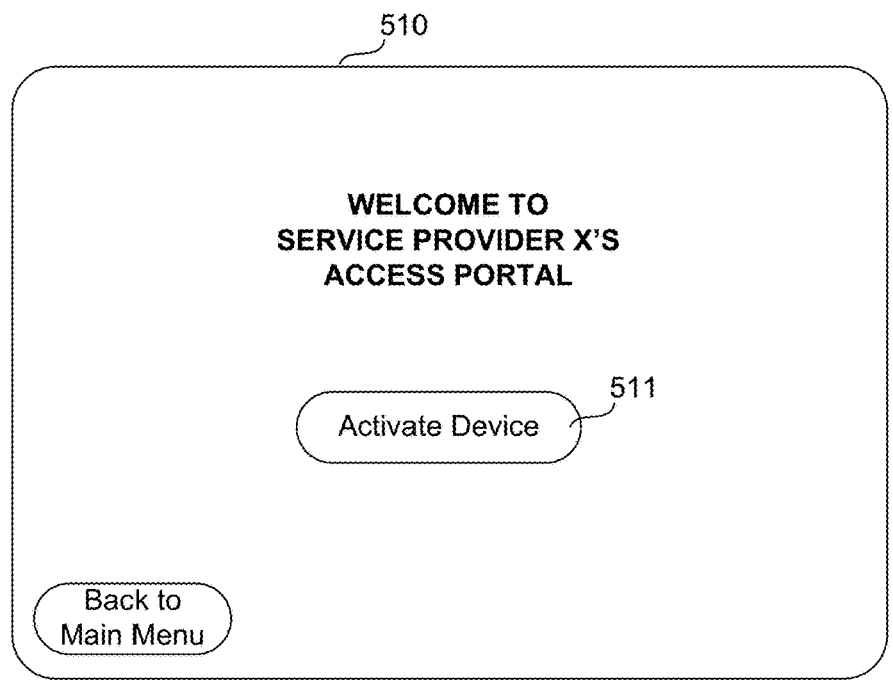

Alternatively, the activation portal may be implemented as a screen stored on the gateway 304. For example, a user may go to a menu screen on their STB and navigate to the activation portal screen. Image data for providing the activation portal screen may be preconfigured on the STB or may be downloaded to the STB from the local office 303. In some cases, the activation portal screen may be included within an electronic programming guide or similar menu that is downloaded intermittently or periodically (e.g., each day in the middle of the night). An example of the activation portal screen accessible via the gateway 304 (e.g., an STB) is illustrated in FIG. 5B. As shown in FIG. 5B, the activation portal screen 510 may simply include an activation device option 511 (of course other information may also be added to the screen). A user may select the activation device option 511 by operating a remote control (e.g., television remote control or STB remote control). In response to selecting the activate device option 511, the gateway 304 may send information upstream to the local office 303 indicating that a wireless device is to be activated at the premises. This information may also include information identifying the gateway 304 (e.g., a STB ID). Notably, a user might not have to log-in to the activation portal when accessing it through the gateway 304. The local office 303 may store information correlating gateway IDs with the location of a premises, so the local office 303 may learn the location of the premises from the gateway ID. Alternatively, the gateway 304 may be associated with a particular premises and may store information indicating the location of that premises which it may then send to the local office 303 when the user selects the activate device option 511.

Figure 5C:
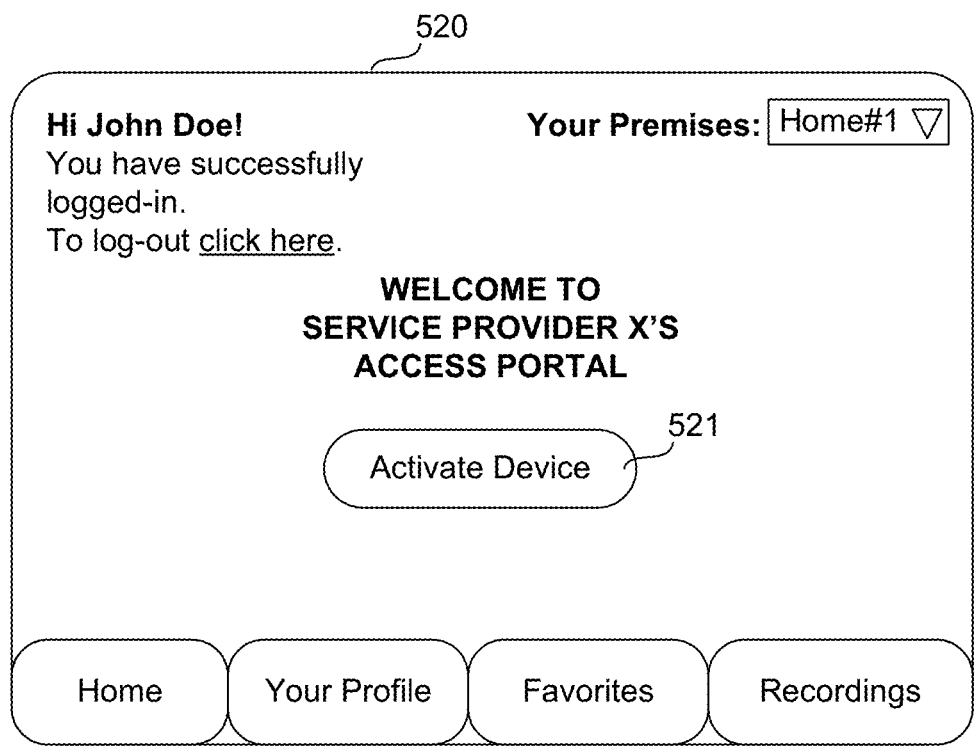

In yet another example, the activation portal may be implemented as a screen within a computer-executable program. The user may access the activation portal by launching a program using any computing device, such as a tablet, smartphone, gateway 304, PC, etc. The program may be used for other purposes as well, like for scheduling television shows, movies, and other content to record, or for controlling a home security system. The program may have been previously configured with the user account information, and thus, may be associated with a particular premises or group of premises. The program may automatically authenticate the user, so the user might not have to log-in as when accessing the activation portal using a web browser. FIG. 5C illustrates an example of an activation portal screen 520 displayed by a program launched and executing on a computing device. The illustrative activation portal screen 520 of FIG. 5C is shown as being similar to the web page of FIG. 5A, although it is not accessed by a web browser. When the activate device option 521 is selected, the program may cause the computing device it is being executed on to send a signal to the backend system. This signal may include information indicating that a device is to be activated at a premises, as well as information identifying the premises (or geographic location of a premises, e.g., a physical address, geographical coordinates, etc.). The information may be included within IP packets (e.g., IPv4 or IPv6 packets) and transmitted over the WAN 312 (e.g., Internet) to the backend system in the local office 303.

As shown in FIGS. 5A-5C, each of the activation portals described above provides a single action (e.g., one click, one swipe, one command, etc.) process for provisioning the wireless device. Image recognition processes (e.g., identifying a gesture) and/or audio recognition processes may also be used to detect a user's selection of an activate device option 501, 511, 521. After the activate device option 501, 511, 521 is selected, the user might not be required to enter any other information. The single act of selecting the activate device option 501, 511, 521 will trigger the backend system to provision the wireless end device 310 and activate the wireless end device 310 without further input from the user as further described below.

In some embodiments, after the active device option 501, 511, 521 is selected, a screen may be displayed (either by the web browser, STB, or program) instructing the user to turn on the wireless end device 310. In particular, the instructions may indicate a time frame (e.g., within the next 10 minutes) in which the user is advised to turn on the wireless end device 310. The time frames may be fixed or may vary. Should statistical data indicate that people need more time to turn on the wireless end devices 310, the time frames may be lengthened. In some cases, the screen providing the time frame may continue to be displayed until the time frame comes to an end. In other words, if, for example, a web page includes a message advising the user to turn on the wireless end device 310 within the next 10 minutes, that web page may be displayed for 10 minutes and then refresh to remove the message. In some examples, the screen may include a clock showing the user how much time he/she has left to turn on the device. If the user fails to turn on the device within the time frame provided, he/she might have to re-select the activate device option 501, 511, 521 to activate the device. Moreover, after displaying the screen with instructions to turn on the wireless end device 310, the activation portal may be exited. For example, in the case where a web browser is used to access the activation portal, the user may be logged out automatically. Or, in the case where a program is launched, the program may close or return to a home screen.

In some embodiments, rather than navigate to an activation portal, various other actions may be taken to indicate the desire to activate a device. For example, the wireless end device (or its packaging) may be configured with an RFID tag. In such a case, the RFID tag may be placed within range of an RFID reader (which may be connected to a gateway 304) to trigger a gateway 304 to send information to the backend system indicating a user's intention to connect an end device to a local network at the premises. Alternatively, NFC communication may be used to send a signal from the end device to an NFC interface coupled to a gateway 304 in order to trigger the backend system to begin the provisioning process. In light of these examples, further actions should be understood as being within the scope of this disclosure.

After step 405, the backend system may identify the premises at which the user intends to activate a wireless device at step 410. Specifically, in response to receiving information indicating that an activate device option 501, 511, 521 was selected, the backend system may identify the corresponding premises at step 410. Step 410 may include comparing user account information, premises location information, and/or gateway IDs in the information received with user account information stored in the backend system (e.g., in application server 107) or in a device coupled to the backend system (e.g., a database internal or external to the local office 103 and coupled to application server 107) to discover matches. Referring to FIG. 3, if a user selects the activate device option 511 using the gateway 304 in the premises 301, the backend system of the local office may identify the premises 301 at step 410 because it knows that gateway 304 of premises 301 is associated with premises 301. Alternatively, if a user associated with premises 301 (e.g., lives at premises 301, works at premises 301, or pays the bill for receiving services through the gateway 304 at premises 301) accesses the activation portal via a web browser using a tablet and selects the activate device option 501, the backend system may identify that an end device is to be added to premises 301 at step 410 based on user account information of the user logged into the activation portal.

In step 415, the backend system may determine a set of candidate gateways to monitor. As described herein, the wireless end device 310 may connect to an unintended local wireless network. For example, the wireless end device 310 may connect to a local wireless network at a neighboring premises. Referring to FIG. 3, for example, a user in premises 301 may attempt to incorporate a new wireless end device 310 into a local network at premises 301, but when the wireless end device 310 is turned on for the first time, it might connect to a local network at premises 302. In light of this circumstance, the backend system may include the gateway 304 on premises 302 in its set of candidate gateways to monitor. Thus, if the wireless end device 310 undesirably connects to the gateway 304 on premises 302, the backend system may still identify the wireless end device 310.

Figure 6:
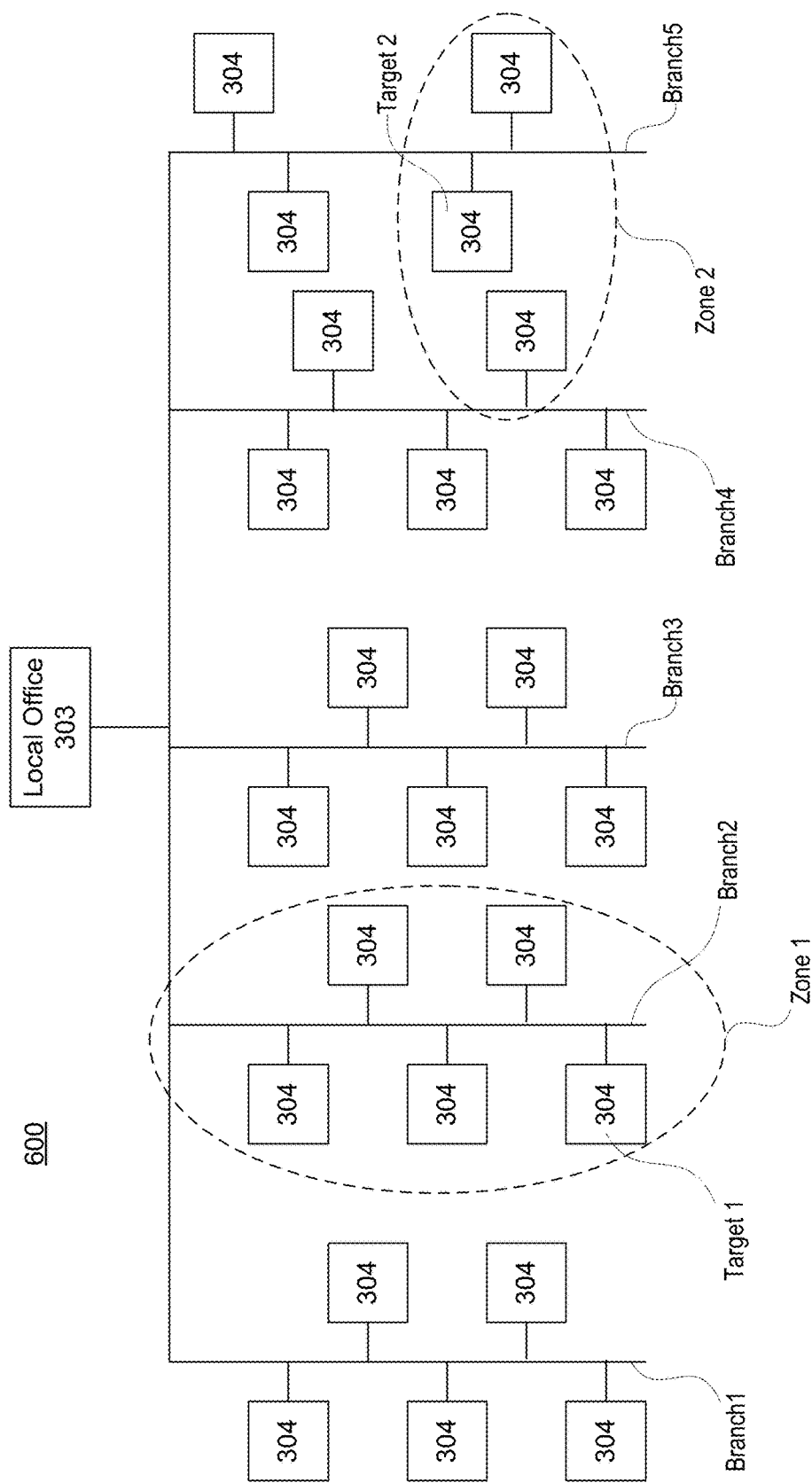
FIG. 6 is a diagram illustrating additional aspects of the disclosure.

FIG. 6 is a diagram illustrating an aspect of the present disclosure related to determining the set of candidate gateways at step 415. FIG. 6 provides a high-level perspective of a network 600, such as a service provider network, including a plurality of gateways 304 located at various premises 102. FIG. 6 illustrates that the gateways may be distributed on five different branches Branches 1-5. Gateways 304 on a common branch may be serviced by a common local node.

Referring to FIG. 6, if a wireless end device 310 is to be connected at a first target gateway Target 1, then the backend system at the local office 103 may determine that all gateways 304 in Zone 1 are candidates that should be monitored to detect a new wireless end device 310. In this case, Zone 1 may correspond to all gateways on the same branch, Branch 2. In another case, where the wireless end device 310 is to be connected at a second target gateway Target 2, the backend system may determine that all gateways in Zone 2 are candidates that should be monitored to detect a new wireless end device 310. Here, Zone 2 may include all gateways 304 in the network 600 within a certain distance of (e.g., radius from) the second target gateway Target 2. The local office 303 may store the geographical coordinates of each gateway 304 in the network 600. Therefore, the local office 303 may use this information to determine which gateways 304 are within a predetermined distance (e.g., 50 meters, 100 meters, 250 meters, 500 meters, etc.) from the geographical location of the target gateway so that it may establish a set of candidate gateways. Additionally, or alternatively, the backend system may receive an IP address of a device used to access the activation portal, and identify candidate gateways in the surrounding area based on the IP address.

Returning to FIG. 4, after determining the candidate gateways, the backend system may begin monitoring information received from the candidates at step 420. This monitoring may include separately evaluating some or all data received at local office 303 from the candidate gateways 304 to determine whether any portion of the data indicates that a new end device 310 is being added to a local network. When a new end device 310 is added to a local network, the gateway 304 of that local network may generate data and send the data to the local office 303. The data may include a header or other information indicating that the data relates to an end device 310 that has been newly added to a local network. For example, a gateway 304 in accordance with the present disclosure may generate a data structure, including information (e.g., a predetermined code) representing that a new end device 310 has been added as well as information describing the end device 310 (e.g., information indicating a type of end device, serial number of the end device, or model of the end device). Use of such a data structure may facilitate quick evaluation of whether any candidate gateways 304 are reporting new end devices 310. The local office 303 (or backend system) may receive numerous data (e.g., requests for content, requests for service, responses to polls, etc.) from gateways 304 and/or other devices, so the data structure and backend system may be configured (e.g., programmed) to readily discern the data structure (having information regarding a new end device) from other types of data. In some embodiments, the data structure may include an IP address and/or MAC address of the end device 310 and/or an IP address and/or MAC address of the gateway 304 transmitting the data structure.

Also at step 420, the backend system may store a start time at which the backend system begins to monitor the candidate gateways. The start time may be an actual time (e.g., 1:15 pm) based on universal time or a pseudo-time based on an internal clock. The backend system may store such a time so that it can keep track of how long it has been monitoring the candidate gateways 304. In some embodiments, if a predetermined amount of time elapses from the start time, the backend system may stop monitoring the candidate gateways 304.

In step 425, a user may be directed to turn on the wireless end device 310. Step 425 may be optional. In some embodiments, where the user is directed to turn on the wireless end device 310 immediately after selecting the activate device options 501, 511, 521 in the activation portal as described above, a separate step of directing the user to turn on the wireless device might not be performed at step 425. Still, in some embodiments, step 425 may be performed in addition to directing the user in the activation portal. In step 425, a pop-up message may be displayed on a display device 113 (e.g., a television) connected to the gateway 304 to direct the user to turn on the device. For example, after a user at premises 301 chooses to activate an end device 310 (e.g., using a tablet or smartphone), a pop-up message may be displayed on the television 305 at the premises 301 to instruct the user to turn on the end device 310. Displaying the pop-up message may include turning on the display device 113 if it is off, or may include displaying a separate window overlaying content being displayed on the display device 113. Additionally, or alternatively, the message to direct the user to turn on the end device 310 may be displayed on a screen (e.g., LED screen) of the gateway 304. The message could also be in the form of an audio message output through speakers (e.g., speakers of a display device 113 or a separate audio system). In some embodiments, the audio message may be a short sound bit (e.g., a beep/chime or series of beeps/chimes) that symbolize to the user that he/she should turn on the wireless end device 310. Similarly, the message may be in the form of a light (e.g., green light) or a blinking light to symbolize to the user that the wireless end device 310 should be turned on.

Step 425 may be performed in response to receiving a signal from the backend system (or local office 303) at the gateway 304 where the user is attempting to connect the wireless end device 310. The signal may be sent when the backend system starts monitoring in step 420. Alternatively, the gateway 304 may be triggered to direct the user to turn on the end device 310 by the activation portal. The activation portal may cause the gateway 304 to output a message after a predetermined amount of time from the time at which the user selects the activate device option 501, 511, 521. This predetermined amount of time may correspond to an estimated amount of time that it takes for the backend system to perform steps 410-420. Accordingly, the user can be directed to turn on the wireless end device 310 after the backend provisioning system is set up to monitor candidate gateways 304.

In step 430, the user may turn on the wireless end device 310. This may include flipping a power switch, plugging the wireless end device 310 into a power outlet, and/or charging and/or installing batteries. If the wireless end device 310 is already on, the user may reset the wireless end device 310 so that it reboots. Once the wireless end device 310 is turned on or boots up, it may automatically begin to attempt to connect to a local wireless network at step 435. The wireless end device 310 may be preconfigured or pre-programmed (e.g., with firmware) so that it begins the process of attempting to connect to a local wireless network upon being turned on. Alternatively, the wireless end device 310 may have a separate button or switch that may be manipulated to trigger the process of attempting to connect to the local wireless network.

In some embodiments, the wireless end device 310 and a nearby gateway 304 may both be configured to support the IEEE 802.1x standard for communication. If so, the wireless end device 310 and gateway 304 may communicate with one another to connect the wireless end device 310 to the gateway 304 using processes set forth in the IEEE 802.1x standard. Alternatively, instead of using the processes of the IEEE 802.1x standard, the gateway 304 may transmit an activation SSID. After identifying the target premises in step 410, the backend system may send a signal to a gateway 304 at the target premises to instruct the gateway 304 at the target premises to broadcast the activation SSID. The backend system may help to ensure that the wireless end device 310 is connected to the correct gateway 304 by regulating which gateways in the vicinity of the target premises are broadcasting the activation SSID. For example, referring to FIG. 3, the backend system might keep the gateway 304 at premises 302 from broadcasting the activation SSID (e.g., by instructing it to stop broadcasting the activation SSID or by making sure not to provide it with instructions to broadcast the activation SSID) while the gateway 304 at premises 301 is broadcasting the activation SSID in order to connect the new wireless end device 310. Alternatively, rather than being broadcasted in response to an instruction from the backend system, the activation SSID may be broadcasted intermittently (e.g., every 10 seconds) or continuously (e.g., back-to-back).

The activation SSID may be wall-gardened, and designated only for provisioning end devices 310. In other words, the activation SSID may be hidden from users. Hence, a user of the gateway 304 broadcasting the activation SSID might not know the value of the activation SSID. However, the wireless end device 310 may be preconfigured with the activation SSID so that it may communicate with the gateway 304 broadcasting that activation SSID. A plurality of gateways 304 or all gateways 304 of a service provider may be configured to broadcast the same activation SSID, so that the wireless end device 310 may be compatible with any such gateway 304. In other words, gateways 304 at different premises 102 may broadcast the same activation SSID so that the wireless end device 310 preconfigured with the activation SSID can be installed at various premises 102 without entering specific local network information. For example, the gateways 304 in the first premises 301 and the second premises 302 of FIG. 3 may both broadcast the same activation SSID (e.g., particularly if both gateways 304 are supplied by the same service provider). Notably, because multiple gateways 304 may transmit the same activation SSID, the wireless end device 310 may undesirably connect to the wrong gateway. As explained above, the wireless end device 310 may connect to a gateway 304 on, e.g., a neighboring premises.

In some embodiments, different end devices 310 may be preconfigured with different activation SSIDs, and so gateways 304 may be configured to broadcast multiple activation SSIDs. For example, end devices 310 produced by different manufacturers may be configured with different activation SSIDs. Also, for example, different types of end devices (e.g., cameras, motion sensors, lights, STBs, etc.) may be associated with different activation SSIDs. Further, the backend system may provide instructions to the gateways 304 indicating which activation SSIDs they should broadcast. The backend system may store which end devices are preconfigured with which activation SSIDs. Thus, for example, if a user scans a box of a new end device 310 with a bar code reader to initiate activation of the end device (or some other action triggers activation of the end device), the backend system may look-up which device was scanned, determine a corresponding activation SSID, and then instruct the gateway at the target premises to broadcast that activation SSID.

Once the wireless end device 310 is connected to the gateway 304, whichever gateway 304 it is connected to may report the connection to the backend system at step 440. For example, if the wireless end device 310 is connected to the gateway 304 on premises 301, then that gateway 304 may transmit data to the local office 303 indicating that the wireless end device 310 has been newly added at premises 301. However, if the wireless end device 310 is connected to the gateway 304 on premises 302, then that gateway 304 may transmit data to the local office 303 indicating that the wireless end device 310 has been newly added at premises 302. The data transmitted to the local office 303 from the gateways 304 may be included within certain data structures to facilitate detection of the new wireless end device 310 by the backend system. As described above, the gateways 304 may be configured to generate a data structure, including information representing that a new end device 310 is connected thereto and/or information describing the new end device 310. For example, the gateway 304 may generate a data structure with the IP address and/or MAC address of the new wireless end device 310, and transmit that data structure to the backend system so that the backend system can subsequently communicate with the wireless end device 310.

In some embodiments, the wireless end device 310, upon connecting to the gateway 304 using the activation SSID, may be configured to report its new connectivity to the backend system. The gateway 304 may provide the wireless end device 310 with the backend system address or the wireless end device 310 may be preconfigured with the backend system address (or a list of backend system addresses). In such cases, the wireless end device 310 may provide the backend system with its IP address, its MAC address, information identifying the gateway 304 it is connected to (e.g., an IP address, MAC address, serial number of the gateway), and/or other information identifying itself (e.g., information identifying its model number, device type (e.g., camera, sensor, etc.), communication protocols, etc.).

In step 445, the backend system may determine whether a new end device 310 has been connected to a local network. This determination may be made by evaluating the data structure(s) received in step 440. More specifically, the backend system may evaluate data from each of the candidate gateways 304 identified in step 415 to determine whether a data structure received from one of the candidate gateways 304 indicates that the wireless end device 310 has been connected to that gateway 304. By evaluating the data from each of the candidate gateways 304, the backend system may detect the wireless end device 310 even if the wireless end device 310 connects to the wrong premises (e.g., a neighbor's premises). Where the report of connectivity sent in step 440 is provided to the backend system from the wireless end device 310, detection at step 445 may include reading/evaluating the report to determine that the report indicates that a new end device has been connected.

If a new end device 310 is not detected at step 445, step 450 may be performed to determine whether a predetermined amount of time has elapsed since the backend system began monitoring the candidate gateways 304. To make this determination, the backend system may reference the start time stored in step 420. Specifically, the backend system may compute the difference between a current time (e.g., time of the determination) and the start time, and compare the difference with a predetermined threshold (e.g., 2 minutes, 10 minutes, 15 minutes, etc.). The predetermined threshold may be set so as to give the user time to turn on the device and allow time for the device to power on and connect to the gateway 304 using the activation SSID. In some cases, the user may designate or otherwise choose this threshold (e.g., from a list of possible thresholds) through the activation portal when initiating activation of the new end device 310. If the threshold has not been exceeded (e.g., the predetermined time is not elapsed), the backend system may continue to monitor data received from the candidate gateways. Where multiple similar devices are being connected at two premises (e.g., homes) in close proximity at the same (or approximately the same) time, the remote location computing device may coordinate among the premises to delay registration of one device until the other premises has correctly registered the competing device. Also, the backend system could assign different time windows for different users to turn on their devices so if a device detected in that window it would more likely be the device in that premises. Additionally, in this unlikely circumstance, the system may require additional information such as a serial number.

If the backend system determines that the threshold has been exceeded (e.g., the predetermined time has elapsed) at step 450, the backend system may instruct the gateway 304 at the premises 102 associated with the user who selected the active device option 501, 511, 521 to inform the user that a time for connecting the new device has expired. For example, if a user associated with premises 301 fails to turn on the wireless end device 310 or the wireless end device 310 is not detected within a certain period of time, the local office 303 may send information to the gateway 304 at the premises 301 to instruct the gateway 304 to notify the user accordingly. The user may be notified of the expired time in any of the manners described above with respect to step 425. For example, a gateway 304 may display a message on a television 305 connected thereto. The message may indicate that the time has expired. Additionally, or alternatively, the message may instruct the user to reset the wireless end device 310 and/or return to the activation portal to re-select the activate device option 501, 511, 521. In some embodiments, when time elapses, the backend system may instruct the gateway to re-broadcast the activation SSID (or try a different activation SSID).

Returning to step 445, if the new wireless end device 310 is detected, step 460 may be performed to associate the wireless end device 310 with the premises 102 identified in step 410. Step 445 may also include associating the wireless end device 310 with the user account that is associated with the premises. For example, after detecting the wireless end device 310 being added to premises 301, the wireless end device 310 may be associated with the user account that is associated with providing service (e.g., cable television service or home security service) to the premises 301.

Further, step 460 may include storing information related to the wireless end device 310. In particular, the backend system may store information describing the wireless end device 310 that is received in the report at step 440. For example, if the wireless end device 310 is a security camera being connected to premises 301, the backend system may update a security system profile affiliated with the premises 301 to identify the make and model of the camera, serial number of the camera, and/or a list of capabilities of the camera. The backend system may also receive and store information, such as a MAC address and/or IP address of the end device 310 and/or connection (e.g., WiFi connection) characteristics of the end device 310 (e.g., capacity, noise level, type, speed, etc.). After the wireless end device 310 is connected using the activation SSID in step 440, the backend system and wireless end device 310 may exchange one or more communications so that the backend system may acquire various information regarding the wireless end device 310 and store such information in association with a user account.

In step 465, the backend system may communicate with the new wireless end device 310 to provide the new wireless end device 310 with the local network information (e.g., home/business SSID, password, etc.) of the premises 102 where the wireless end device 310 is being added. For example, referring to FIG. 3, if the wireless end device 310 is being added to premises 301, the backend system may provide the wireless end device 310 with the specific local network information (e.g., home SSID) of the gateway 304 on the premises 301. If the same wireless end device 310 was being added to premises 302, the backend system would send the specific local network information (e.g., home SSID) of the gateway 304 on the premises 302. Notably, the home SSID at premises 301 may be different from the home SSID at premises 302, as these may be set up by the users at the respective homes. As a result of step 465, the wireless end device 310 may receive the local network information of a target premises without requiring a user to enter the local network information into the wireless end device 310. Further, it should be understood that the wireless end device 310 may receive the local network information of the target premises even though the wireless end device 310 may be initially connected (using the activation SSID) to a gateway 304 at a different premises (e.g., a premises other than the target premises). Because the backend system may be notified of the wireless end device 310 by various gateways, it may learn of the wireless end device's location even when it is connected to an undesired gateway. Moreover, the backend system may correct the situation by sending the correct local network information of the target premises to the wireless end device 310, thereby forcing the wireless end device 310 to disconnect from the wrong gateway and connect to the right one.

To support step 465, the backend system may employ a database with local network information for each gateway 304 that it may service. For example, referring to FIG. 6, the local office 303 may include a specific local SSID for each gateway 304 it is connected to. Such local network information may be stored in association with user account information, which may include username and password for the activation portal, additional information about one or more premises 102 (e.g., geographical location, list of devices therein, etc.), billing information, etc.

Alternatively, rather than communicating directly with the new wireless end device 310, the backend system may instruct the appropriate gateway 304, which is identified in step 410, to transmit its local network information to the wireless end device 310. In other words, the gateway 304 may act as an intermediary for providing the local network information. Other devices may also similarly act as intermediaries (or proxies). For example, an alarm panel may act as an intermediary for providing the local network information to a newly added security sensor type of end device 310. The instruction sent by the backend system may be included in a unicast signal sent downstream from the local office 303 to, e.g., the specific gateway 304 on the premises 102 where the wireless end device 310 is being added. The gateway 304 may store (either locally or remotely) the local network information of the local network on the premises 102 at which the gateway 304 is located. For example, the gateway 304 at the premises 301 may store information related to a local network connecting the gateway 304 and other end device(s) 310 at the premises 301. The local network information may include the SSID of the local network (e.g., a home SSID).

In some embodiments, there may be multiple gateways 304 at a single premises 102. If so, the backend system may instruct each of the gateways 304 on the premises 102 to broadcast the local network information. This may provide a larger coverage area to which the local network information may be supplied, and thus, may increase the likelihood that the wireless end device 310 on the premises 102 may receive the local network information. Also at step 465, in response to receiving the instruction from the backend system, the gateway 304 may transmit its local network information to the wireless end device 310. In the case where the wireless end device 310 is connected to the "wrong gateway" (e.g., a gateway at a premises other than the target premises), the backend system may instruct the "wrong gateway" to provide the local network information of the correct gateway to the wireless end device, or to disconnect from the wireless end device 310 so that it may first connect to the correct gateway using the activation SSID. As a result, the wireless end device 310 may receive the local network information of a target premises without requiring a user to enter the local network information into the wireless end device 310.

In step 470, the wireless end device 310 may reconnect to the gateway 304 using the local network information (e.g., home SSID) received in step 465. In other words, instead of using the activation SSID to connect to the gateway 304, the wireless end device 310 may use the specific SSID of the local network to connect to the gateway 304. Various processes could be used to switch the wireless end device 310 from using the activation SSID to using, e.g., a home SSID. In some embodiments, the wireless end device 310 may restart or reboot in order to reconnect to the gateway 304 using the local network information. The wireless end device 310 may automatically restart in response to receiving the local network information. For example, the wireless end device 310 may be preconfigured (e.g., programmed) to restart when it receives the local network information. Additionally, or alternatively, the wireless end device 310 may have an open application programming interface (API), and the backend system may instruct the wireless end device 310 to restart through its API when it provides the local network information. In some examples, instead of automatically restarting the wireless end device 310, the backend system may instruct a user (e.g., by displaying a message on a display device connected to the local network) to restart the wireless end device 310. In any event, when the switch occurs, the wireless end device 310 may overwrite the activation SSID with the local network SSID (e.g., home SSID, business SSID, etc.). In some embodiments, although the activation SSID may be overwritten with the local network SSID, the wireless end device 310 may still store a copy of the activation SSID. As such, the wireless end device 310 could later be installed and automatically provisioned at another premises 102 using the activation SSID. Therefore, for example, if a user moved to a new home, the user could bring the same wireless end device 310 to their new home and automatically provision it there as described herein.

In step 475, a user may confirm that the end wireless device 310 has been successfully incorporated into the local network. This confirmation may be performed by first accessing a confirmation portal similar to the activation portal. For example, a user may access a confirmation portal by controlling the gateway 304 (e.g., a set top box) to navigate through a menu stored by the gateway 304. While confirming that the wireless end device 310 is connected, the user may assign a name to the wireless end device 310. For example, if the wireless end device 310 is a security camera monitoring a side door entrance to a house, the user may assign a name, such as "the side door camera," that makes it easy for the user to identify the wireless end device 310. Such a descriptive name may be used by the backend system to provide certain services, such as notifying the user if the wireless end device malfunctions, needs repair, is running low on battery power, etc.

Although example embodiments are described above, the various features and steps may be combined, divided, omitted, rearranged, revised, and/or augmented in any desired manner to accommodate various use cases. For example, in the backend provisioning process of FIG. 4, the user may turn on the wireless end device 310 prior to accessing the portal. In case of such a situation, the backend system may request candidate gateways 304 to report whether any devices have recently been turned on. Additionally, the backend system may begin to monitor candidate gateways as described in step 420 as the candidate gateways 304 are determined in step 415. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:
1. A method comprising:
receiving, by a computing device, a request to connect a device to a particular network;
identifying, based on the request, one or more gateways;
causing the one or more gateways to transmit a dedicated activation service set identifier (SSID);
receiving, from a first gateway of the one or more gateways, first information indicating that the device is connected to the first gateway using the dedicated activation SSID; and
after receiving the first information, causing the device to reconnect to the first gateway using a specific SSID for the particular network, wherein the specific SSID is different from the dedicated activation SSID.
2. The method of claim 1, further comprising:
prior to receiving the first information, receiving, from a second gateway of the one or more gateways, second information indicating that the device is connected to the second gateway; and
determining, based on the second information, that the device is connected to a different network than the particular network.
3. The method of claim 2, further comprising:
based on determining that the device is connected to the different network, transmitting an instruction to the second gateway to disconnect from the device.
4. The method of claim 2, further comprising evaluating information, comprising the first information and the second information, received from the one or more gateways,
wherein the evaluating comprises detecting, in a header of a packet, information indicating that a new device has been added.

5. The method of claim 2, further comprising:
evaluating information, comprising the first information and the second information, received from the one or more gateways;
storing a start time indicating a time at which the evaluating begins; and
prior to the determining that the device is connected to the different network, continuing the evaluating based on an amount of time since the start time being less than a predetermined amount of time.

6. The method of claim 1, wherein the dedicated activation SSID is wall-gardened and hidden such that it is not made visible to a user by the one or more gateways or the device.

7. The method of claim 1, wherein the identifying the one or more gateways comprises, identifying, based on a location of a gateway from which the request is received, the one or more gateways.

8. The method of claim 1,
wherein the request comprises a gateway identifier that identifies a gateway that generated the request, and
wherein the identifying the one or more gateways comprises:
determining, based on the gateway identifier, a location of the gateway; and
determining, based on the location of the gateway, gateways within a predetermined distance from the location to identify the one or more gateways.

9. The method of claim 1, wherein the identifying the one or more gateways comprises:
determining a gateway that transmitted the request;
determining that the gateway is on a first branch of a cable network; and
determining all gateways on the first branch to identify the one or more gateways.

10. The method of claim 1, wherein the identifying the one or more gateways comprises:
determining a gateway that transmitted the request;
determining that the gateway is in a first predefined zone of a cable network; and
identifying all gateways in the first predefined zone to identify the one or more gateways.

11. A method comprising:
receiving a request to connect a device to a particular network at a target premises;
evaluating information received from a set of gateways;
determining, based on an amount of time, since a stored start time of the evaluating, being less than a predetermined amount of time, to continue the evaluating;
based on the evaluating, determining that the device is connected, using initial connection information, to a different network than the particular network; and
transmitting, by a computing device, an instruction to change the initial connection information used by the device, to network connection information of the particular network, to connect the device to the particular network.

12. The method of claim 11, further comprising:
prior to the evaluating, causing the set of gateways to broadcast the initial connection information,
wherein the set of gateways is located within a predetermined distance from the target premises.

13. The method of claim 11, wherein the initial connection information comprises a hidden service set identifier (SSID),
wherein the network connection information comprises a particular SSID for the particular network,
wherein the hidden SSID is different than the particular SSID,
wherein the transmitting the instruction comprises transmitting, by the computing device to a gateway of the different network, the instruction, and
wherein the instruction further causes the gateway of the different network to transmit an instruction to the device to change from the hidden SSID to the particular SSID and causes the device to connect to the particular network using the particular SSID.

14. The method of claim 13, further comprising, prior to the transmitting the instruction:
determining, based on the request, the particular SSID for the particular network.

15. A system comprising:
a set of gateways; and
one or more computing devices; comprising:
one or more processors, and
memory storing computer-executable instructions that, when executed by the one or more processors, cause the one or more computing devices to:
receive a request to connect a device to a particular network at a target premises;
evaluate information received from the set of gateways;
determine, based on an amount of time, since a stored start time of the evaluating, being less than a predetermined amount of time, to continue to evaluate the information;
determine, based on the evaluating, that the device is connected, using initial connection information, to a different network than the particular network; and
transmit an instruction to change the initial connection information used by the device, to network connection information of the particular network, to connect the device to the particular network.

16. The system of claim 15, wherein the computer-executable instructions, when executed, further cause the one or more computing devices to:
cause, prior to evaluating the information received from the set of gateways, the set of gateways to broadcast the initial connection information,
wherein the set of gateways is located within a predetermined distance from the target premises.

17. The system of claim 15, wherein the initial connection information comprises a hidden service set identifier (SSID),
wherein the network connection information comprises a particular SSID for the particular network,
wherein the hidden SSID is different than the particular SSID, and
wherein the instruction to change the initial connection information used by the device further causes a gateway of the different network to transmit, to the device, an instruction to change from the hidden SSID to the particular SSID and causes the device to connect to the particular network using the particular SSID.

18. The system of claim 17, wherein the computer-executable instructions, when executed, further cause the one or more computing devices to:
determine, based on the request, the particular SSID for the particular network.

* * * * *

UNITED STATES PATENT AND TRADEMARK OFFICE
CERTIFICATE OF CORRECTION

PATENT NO. : 10,148,520 B2
APPLICATION NO. : 15/412106
DATED : December 4, 2018
INVENTOR(S) : Lee et al.

Page 1 of 1

It is certified that error appears in the above-identified patent and that said Letters Patent is hereby corrected as shown below:

In the Specification

Column 10, Detailed Description, Line 30:
Please delete "314" and insert --311--

Column 11, Detailed Description, Line 1:
Delete "318" and insert --317--

Signed and Sealed this
Fifth Day of March, 2019

Andrei Iancu
*Director of the United States Patent and Trademark Office*